April 7, 1931.  J. W. HEAGNEY  1,800,142
COLLISION GUARD FOR VEHICLES
Filed Oct. 14, 1930  2 Sheets-Sheet 1
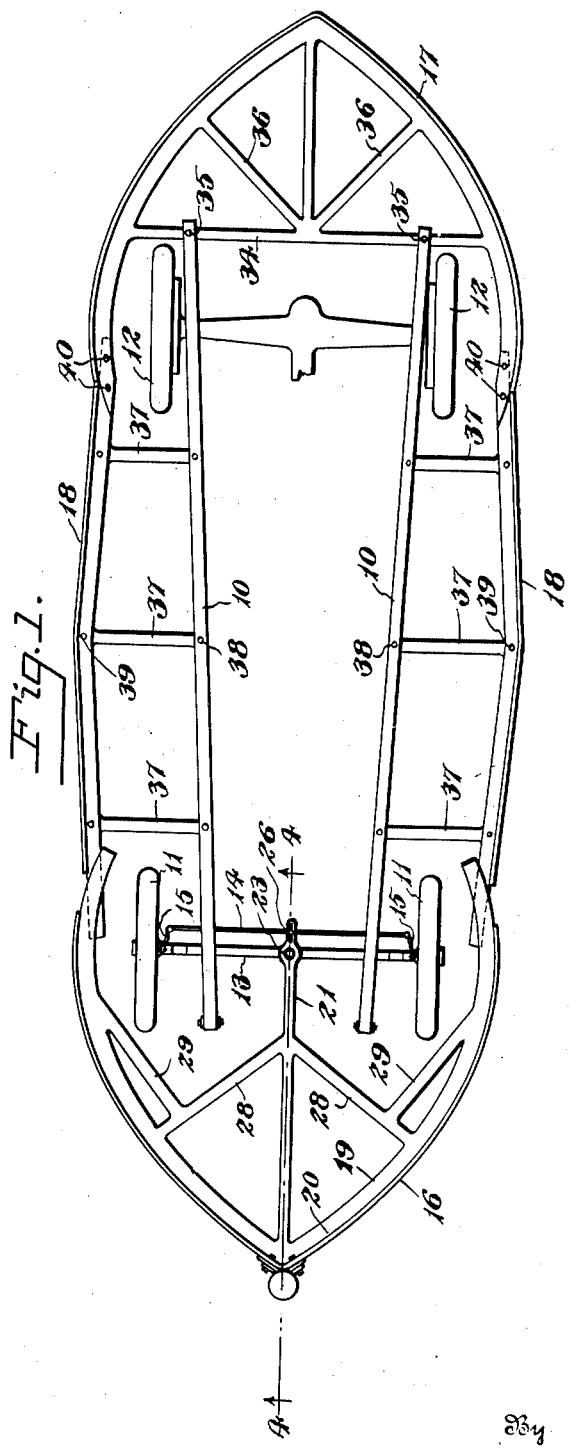
Inventor
J. W. Heagney
By Lacey & Lacey,
Attorneys April 7, 1931. J. W. HEAGNEY 1,800,142
COLLISION GUARD FOR VEHICLES
Filed Oct. 14, 1930 2 Sheets-Sheet 2
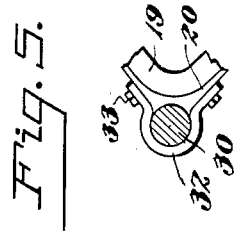
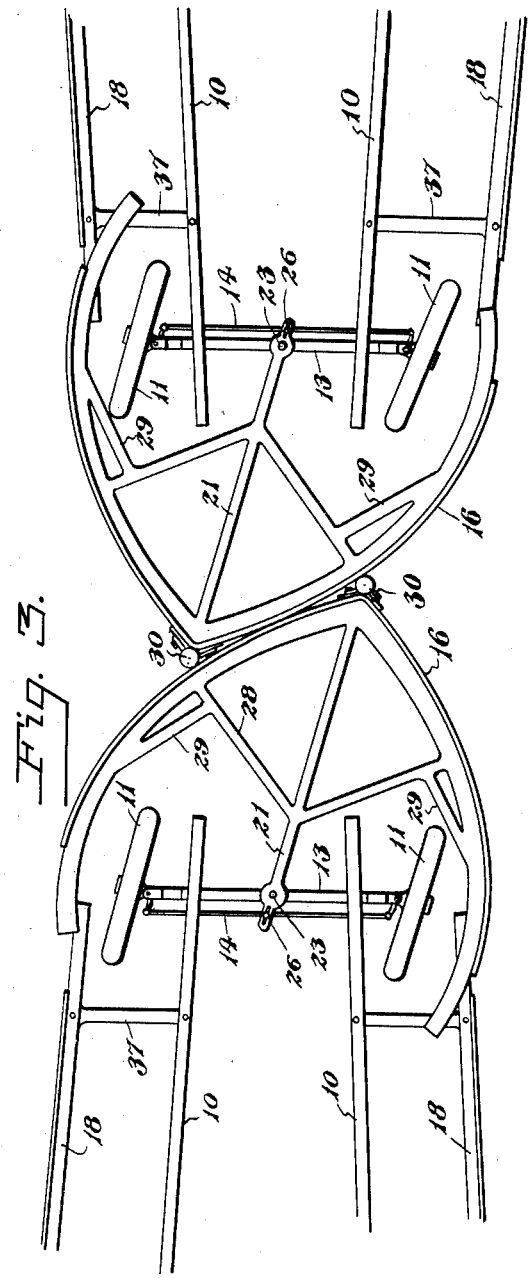
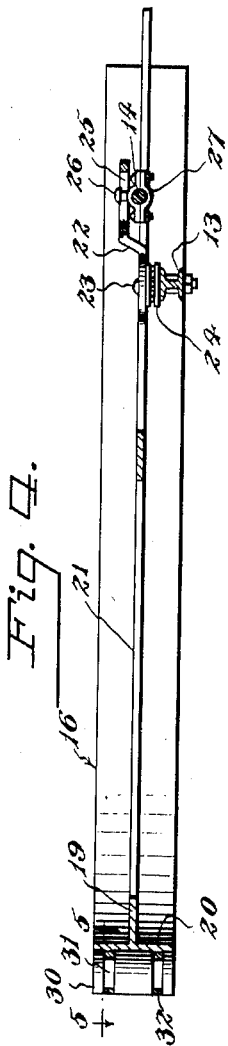
Inventor
J. W. Heagney
By Lacey & Lacey, Attorneys Patented Apr. 7, 1931

1,800,142

UNITED STATES PATENT OFFICE

JOHN W. HEAGNEY, OF MIDLAND, SOUTH DAKOTA

COLLISION GUARD FOR VEHICLES

Application filed October 14, 1930. Serial No. 488,619.

This invention relates to collision guards for vehicles and has for an object to provide a pivoted front bumper and rigid side and rear bumpers, each of the bumpers diverging from the center thereof whereby to deflect a colliding vehicle laterally.

A further object of the invention is to provide a collision guard having the pivoted front bumper operatively connected to the steering mechanism of the vehicle and adapted to automatically turn the front wheels laterally at the instant of colliding so that the vehicle will effectively dodge the obstructing vehicle without injury to the occupants of either vehicle.

A still further object of the invention is to provide a collision guard which may be easily and quickly installed on the chassis of a vehicle and which may be constructed for the most part of band iron of substantially eight inches more or less in width so as to produce an effective all metal guard surrounding the front, sides and rear of the running gear of the vehicle outside of the wheels thereof.

A still further object of the invention is to provide a collision guard which will be formed of a few strong, simple and durable parts which are inexpensive to manufacture and which will not easily get out of order.

With the above and other objects in view the invention consists in certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a plan view of a chassis of an automobile showing the collision guard assembled therewith, Fig. 2 is a side elevation of the collision guard disposed in operative position at about the height of the wheel centers, Fig. 3 is a fragmentary plan view showing the position of the parts in a head-on collision, Fig. 4 is an enlarged cross sectional view taken on the line 4—4 of Fig. 1, and Fig. 5 is a detail cross sectional view taken on the line 5—5 of Fig. 4.

Referring now to the accompanying drawings in which like characters of reference designate similar parts in the various views, 10 designates the frame, 11 front wheels, 12 the rear wheels, 13 the front axle, and 14 the tie rod which connects the steering knuckles 15, these parts being all of the usual and well known automobile chassis construction.

In carrying out the preferred embodiment of my collision guard, I provide a front bumper 16, a rear bumper 17, and side bumpers 18, each of the bumpers being shaped to diverge from the center thereof in order to present inclined surfaces for deflecting a colliding vehicle which may strike from any angular direction either in a head-on, broad side, or tail colliding accident.

Preferably, the bumpers are formed of band iron of substantially eight inches more or less in width so as to present extensive surfaces to accommodate the device to adequately protect the running gear of the vehicle. Each bumper is preferably formed T-shaped in cross section to provide a horizontal web 19 and a vertical flange 20, the web constituting attaching means and the flange constituting the strong deflecting surface.

More specifically, the front bumper 16, in addition to diverging from the center point thereof, is gently curved rearwardly, as is also the rear bumper 17. The front bumper is pivoted to the front axle 13 of the chassis by means of an axial bar 21 which, as best shown in Fig. 4, is formed with a goose neck 22 near the front axle and extends from the goose neck horizontally to a point beyond the tie rod 14 of the steering knuckles. A king pin 23 carried by the front axle is passed through the bar 21 to pivotally secure the bar to the front axle and preferably a thrust bearing 24 is interposed between the bar and the top of the front axle to receive the weight of the bumper. The rear end of the rod 21 is provided with a longitudinal slot 25 through which a pin 26 is passed, the pin being connected by a clamp 27 to the tie rod 14. Obviously, in the event of a head-on collision, as best shown in Fig. 3, the front bumper will pivot on the front axle and will automatically turn the front wheels 11 laterally at the instant of colliding. The bar 21 is braced by diagonal braces 28, which latter are in turn braced by inclined braces 29, the braces all being rigidly secured by brazing or otherwise at the outer ends to the web 19 of the bumper.

To start the pivotal movement of the front bumper so that the vehicle will effectively dislodge laterally during a head-on collision, a roller 30, as best shown in Fig. 5, is mounted at the apex of the front bumper and preferably the roller is provided with a pair of grooves 31 which loosely receive straps 32 that are bolted or otherwise rigidly secured, as shown at 33, to the flange 20 of the bumper above and below the web 19 thereof.

The rear bumper 17 is rigidly secured to the chassis frame 10 by means of a transverse brace bar 34, the same being bolted, as shown at 35, to the frame. Radially disposed brace bars 36 are secured to the center of the brace bar 34 and are secured at the outer ends to the web of the bumper in any preferred manner, such for instance as brazing or the like.

The side bumpers 18 are rigidly secured to the frame 10 of the chassis by means of horizontal brace bars 37 which are preferably spaced equi-distant apart and are arranged preferably parallel. The brace bars 37 are preferably bolted at the inner ends to the chassis frame, as shown at 38, and are preferably bolted at the outer ends, as shown at 39, to the webs of the side bumpers.

By now referring to Figs. 1 and 2, it will be seen that the flanges of the side bumpers are cut away at the front ends so that the rear ends of the front bumper are received on the webs of the side bumpers and are slidably supported thereby during pivotal movement of the vehicle front wheels 11. The rear ends of the side bumpers are rigidly secured to the front ends of the rear bumper by bolts 40 whereby the rear bumper and both side bumpers are rigidly associated as an integral unitary structure.

From the above description, it will be seen that I have provided an extremely strong and rigid collision guard for protecting the front, sides and rear of a vehicle from injury during a collision. It will be further observed that the pivoted front bumper operates automatically to turn the steering mechanism independently of the driver so that the front wheels are instantly turned to deflect the vehicle laterally from a colliding vehicle during a head-on collision. It will be still further observed that the collision guard is formed of a few strong durable and simple parts which are inexpensive to manufacture and which, when applied to a vehicle chassis will not easily get out of order due to vibration or other causes.

It will be pointed out that the goose neck 22 may pass under the axle instead of over it, as above described.

Having thus described the invention, I claim:

1. The combination with a vehicle chassis of a protective band of substantially T-shaped cross section extending entirely around and outside of the running gear of said chassis, the front portion of said band being pivoted to move as a unit with the steering mechanism of the vehicle.

2. The combination with a vehicle chassis of a substantially continuous band extending around the running gear outside of the wheels thereof, means for supporting the front portion of said band pivotally upon the front axle of the vehicle, means for operatively connecting said front portion of the band to the tie rod of the vehicle steering mechanism, and a sliding connection between the rear ends of said pivoted front portion of the band and those portions of the band which extend along the sides of the running gear.

3. The combination with a vehicle, of a protective band extending around said vehicle and outside of the wheels thereof, said band having the front, sides and rear portions thereof diverging from the center point respectively of said front, sides and rear portions, said band being pivoted at the front portion thereof to swing relatively to the side portions of the band, and means for fastening said band to the chassis of the vehicle.

4. A collision guard for vehicles comprising a pivoted front bumper, rigid rear and side bumpers, said bumpers each diverging from the center thereof to deflect colliding vehicles, and means for operatively connecting the front bumper to the steering mechanism of the vehicle and adapted to turn the front wheels laterally at the instant of colliding.

5. A collision guard for vehicles comprising a front bumper adapted to be pivoted to the front axle of a vehicle, means for operatively connecting the bumper to the tie rod of the vehicle steering mechanism whereby pivotal movement of the bumper operates to pivot the vehicle front wheels, said bumper diverging laterally from the center thereof, an upright roller on the center of said bumper for starting pivotal movement thereof at the instant of a head-on collision, and side and rear bumpers adapted to be rigidly connected to the vehicle chassis.

6. A collision guard for vehicles comprising a front pivoted bumper, means for operatively connecting the bumper to move as a unit with the tie rod of the vehicle steering mechanism, a rear bumper, side bumpers, means for rigidly securing the rear bumper to the vehicle chassis, means for rigidly securing the ends of the rear bumper to the rear ends of the side bumpers, and means for rigidly securing the side bumpers in spaced relation to the frame of the vehicle.

7. A collision guard for vehicles comprising a pivoted front bumper, rigid rear and side bumpers, means for fixedly securing said side and rear bumpers to the frame of the vehicle chassis, the rear ends of the front bumper being supported upon and being slidably fitted upon the front ends of said side bumpers, means for pivotally securing the front bumper near the rear end thereof to the vehicle front axle, and means for pivotally securing the rear end of the front bumper to the tie rod of the vehicle steering mechanism.

8. A collision guard for vehicles comprising front, side and rear bumpers formed of band iron of substantially T-shaped cross section to provide horizontal webs and vertical flanges adapted to encircle a vehicle chassis braces secured to said webs and adapted to be secured to the frame of the vehicle chassis, the flanges of the side bumpers being cut away at the forward ends whereby the webs thereof slidably receive the front bumper, means for pivotally securing the front bumper to the front axle of the vehicle, and means for pivoting securing the front bumper to the tie rod of the vehicle steering mechanism.

9. A collision guard for vehicles comprising front, side and rear bumpers each diverging from the center thereof to deflect colliding vehicles, said front bumper being provided with an axial brace rod formed at the rear end with a goose neck, said brace rod being extended beyond said goose neck whereby to pass the front axle and tie rod of a vehicle chassis, a king pin passed through said extended end of the brace rod for pivotally securing the front bumper to said front axle, a thrust bearing surrounding said king pin, said extended end of the brace rod being provided with a longitudinal slot, and a pivot pin passed through said slot and terminating in a clamp adapted to be fixedly secured to the tie rod of the vehicle steering mechanism.

10. The combination with a vehicle chassis of a protective band iron guard extending outside of the wheels of the chassis and forming front, side and rear bumpers, a pivotal connection between the front bumper and the front axle of said vehicle for permitting the front bumper to swing clear of the wheels of the vehicle, a roller disposed on the leading end of said front bumper, and means for pivotally connecting said front bumper to the tie rod of the vehicle steering mechanism, the front ends of said side bumpers rigidly secured to the vehicle chassis and slidably receiving the rear ends of the front bumper, and said rear bumper being rigidly secured to the rear ends of said side bumpers.

In testimony whereof I affix my signature.

JOHN W. HEAGNEY. [L. S.]